(12) United States Patent
Lian et al.

(10) Patent No.: US 12,522,452 B2
(45) Date of Patent: Jan. 13, 2026

(54) METHODS AND APPARATUS FOR AUTOMATIC ITEM PLACEMENT

(71) Applicant: Walmart Apollo, LLC, Bentonville, AR (US)

(72) Inventors: Kunlei Lian, Bentonville, AR (US); Cai Gao, Sunnyvale, CA (US); Cong Guo, San Ramon, CA (US); Mingang Fu, Palo Alto, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 634 days.

(21) Appl. No.: 17/944,606

(22) Filed: Sep. 14, 2022

(65) Prior Publication Data

US 2024/0083698 A1    Mar. 14, 2024

(51) Int. Cl.
*B65G 65/00* (2006.01)
*B65G 57/22* (2006.01)

(52) U.S. Cl.
CPC .......... *B65G 65/005* (2013.01); *B65G 57/22* (2013.01); *B65G 2201/025* (2013.01); *B65G 2203/0225* (2013.01); *B65G 2203/0233* (2013.01)

(58) Field of Classification Search
CPC .......... B65G 2201/0267; B65G 65/005; B65G 57/22; B65G 2201/025; B65G 2203/0225;
(Continued)

(56) References Cited

U.S. PATENT DOCUMENTS 5,908,283 A * 6/1999 Huang ................. G06Q 10/043
   414/21
7,266,422 B1 * 9/2007 DeMotte ................ B25J 9/1687
   414/801
(Continued)

FOREIGN PATENT DOCUMENTS

| CN | 103218667 A | 7/2013 |
| CN | 113298466 A | 8/2021 |
| CN | 113222291 B | 3/2022 |

OTHER PUBLICATIONS

R. Alvarez-Valdes et al., "A tabu search algorithm for the pallet loading problem," Or Spectrum 27(1), (2005), 19 pages.
(Continued)

*Primary Examiner* — Timothy R Waggoner
(74) *Attorney, Agent, or Firm* — Morgan, Lewis & Bockius LLP; Manita Rawat (57) ABSTRACT

This application relates to automated processes for assigning item containers, such as boxes, to a location on a shipping container, such as a pallet. For example, a computing device may receive an item assignment request identifying a plurality of item containers, and determines a subset of the plurality of item containers for assigning to a layer of a shipping container. Further, the computing device determines a plurality of positions and a plurality of orientations for each of the subset of the plurality of item containers. The computing device also assigns the subset of the plurality of item containers to the layer of the shipping container based on the plurality of positions and the plurality of orientations. The computing device further generates an item assignment response identifying the assignments of the plurality of item containers, and transits the item assignment response for display.

17 Claims, 7 Drawing Sheets

(58) Field of Classification Search
CPC ... B65G 2203/0233; B65G 61/00; B65G 57/03; G06Q 10/04; G06Q 10/083; G06Q 10/087; G06Q 10/0831; G06Q 10/063; G06Q 10/043; B25J 9/1687

See application file for complete search history.

(56) References Cited

U.S. PATENT DOCUMENTS

| | | | |
|---|---|---|---|
| 8,560,461 | B1 | 10/2013 | Tian et al. |
| 11,136,149 | B2 | 10/2021 | Que et al. |
| 11,305,430 | B2 | 4/2022 | Fu et al. |
| 11,514,386 | B1 | 11/2022 | Soles et al. |
| 11,681,973 | B1 | 6/2023 | Soles et al. |
| 11,907,889 | B2 | 2/2024 | Soles et al. |
| 12,136,057 | B2 | 11/2024 | Soles et al. |
| 2007/0067146 | A1 | 3/2007 | Devarajan et al. |
| 2009/0169352 | A1 | 7/2009 | Knipfer et al. |
| 2009/0299790 | A1 | 12/2009 | Devarajan et al. |
| 2015/0254758 | A1 | 9/2015 | Wadhawan et al. |
| 2019/0193956 | A1 | 6/2019 | Morland et al. |
| 2019/0236690 | A1 | 8/2019 | Wadhawan et al. |
| 2020/0039668 | A1 | 2/2020 | Que et al. |
| 2020/0334582 | A1* | 10/2020 | Yu .................. G06Q 10/043 |
| 2021/0012522 | A1 | 1/2021 | Wang et al. |
| 2021/0150475 | A1 | 5/2021 | Huang et al. |
| 2021/0276804 | A1 | 9/2021 | Peck |
| 2021/0354922 | A1 | 11/2021 | Gravelle et al. |
| 2021/0403254 | A1 | 12/2021 | Ito et al. |
| 2022/0102133 | A1* | 3/2022 | Dziekonski ........... H01J 49/422 |
| 2022/0402133 | A1 | 12/2022 | Pidaparthi et al. |
| 2023/0042127 | A1 | 2/2023 | Anand P.S et al. |
| 2023/0241776 | A1* | 8/2023 | Kuck ................. B65B 57/00 700/217 |
| 2023/0245034 | A1 | 8/2023 | Tomar et al. |
| 2023/0274218 | A1 | 8/2023 | Soles et al. |
| 2023/0281557 | A1 | 9/2023 | Tomar et al. |
| 2024/0002093 | A1 | 1/2024 | Kalus et al. |
| 2024/0083698 | A1 | 3/2024 | Lian et al. |
| 2024/0220912 | A1 | 7/2024 | Soles et al. |

OTHER PUBLICATIONS

A. Bortfeldt et al., "Applying Tabu Search to Container Loading Problems," Operations Research Proceedings 1997, Springer, Berlin, Heidelberg, 1998, 8 pages.

* cited by examiner

METHODS AND APPARATUS FOR AUTOMATIC ITEM PLACEMENT

TECHNICAL FIELD

The disclosure relates generally to the packaging and shipping of goods and, more specifically, to automatic processes that assign goods to containers for shipping.

BACKGROUND

Stores typically receive goods they sell within shipping containers, such as pallets. For instance, a manufacture of an item may load a pallet with goods and may ship the pallet to a store of a retailer. In some examples, a retailer may receive goods that they plan to sell at a distribution center, and may pack shipping containers with goods they intend to sell at one or more stores. Once packed, the shipping containers are shipped to the retailer's stores. The shipping containers can include a quantity of a single item (e.g., a box of an item), or quantities of multiple items (e.g., multiple boxes of items). There are drawbacks, however, with how shipping containers are packed with goods. For example, the shipping containers may include air gaps, or void spaces, whether otherwise goods may have been stored. As another example, the packing of goods may lead to an unstable shipping container. For instance, a pallet may be packed with goods such that the pallet becomes unstable and, as a result, goods fall over or crush other goods. As such, there are opportunities to improve item packing efficiencies within shipping containers, such as pallets.

SUMMARY

The embodiments described herein are directed to automated processes for assigning items to shipping containers, such as pallets. Specifically, the embodiments determine a best configuration of item containers (e.g., item boxes) at each of a plurality of layers for a shipping container. For instance, the embodiments may determine a size (e.g., a height, width, and length) of each item box, and may determine a position and an orientation of each item box within the shipping container based on the sizes. In some examples, the embodiments may determine one or more additional attributes of each item box, such as a strength, a density, and one or more categories of the items within each box, and may determine the position and orientation of the item box based on the sizes and the one or more additional attributes. The embodiments may further generate assignment data characterizing the positions and orientations of the item boxes within the shipping container. In some examples, the embodiments transmit the assignment data for display.

Among other advantages, the embodiments may increase packing efficiencies when packing shipping containers with items, such as item boxes. For example, the embodiments may reduce void spaces within the shipping containers, and may improve the stability of the shipping containers. As such, the shipping containers, as packed, may reduce damage to items during shipment. Moreover, the embodiments may allow for a reduction in time to prepare shipping containers for shipment, as well as reduce costs associated with shipping, such as by requirement less shipping containers for shipping item containers. Persons of ordinary skill in the art would recognize additional advantages as well.

In accordance with various embodiments, exemplary systems may be implemented in any suitable hardware or hardware and software combination, such as in one or more suitable computing devices. For example, in some embodiments, a computing device (e.g., server) comprises at least one processor and a memory storing instructions. The instructions, when executed by the at least one processor, cause the computing device to generate a first node identifying a configuration of a layer for a shipping container based on an initial position of a plurality of positions and an initial orientation of a plurality of orientations of a plurality of item containers. Further, and when executed by the at least one processor, the instructions cause the computing device to generate a plurality of neighboring nodes identifying corresponding configurations of the layer based on adjusting at least one of the plurality of positions and the plurality of orientations. The instructions, when executed by the at least one processor, also cause the computing device to assign the plurality of item containers to the layer of the shipping container based on the first node and the plurality of neighboring nodes.

In some embodiments, a method by at least one processor includes generating a first node identifying a configuration of a layer for a shipping container based on an initial position of a plurality of positions and an initial orientation of a plurality of orientations of a plurality of item containers. Further, the method includes generating a plurality of neighboring nodes identifying corresponding configurations of the layer based on adjusting at least one of the plurality of positions and the plurality of orientations. The method also includes assigning the plurality of item containers to the layer of the shipping container based on the first node and the plurality of neighboring nodes.

In some embodiments, a non-transitory computer readable medium has instructions stored thereon. The instructions, when executed by at least one processor, cause a device to perform operations that include generating a first node identifying a configuration of a layer for a shipping container based on an initial position of a plurality of positions and an initial orientation of a plurality of orientations of a plurality of item containers. Further, the operations include generating a plurality of neighboring nodes identifying corresponding configurations of the layer based on adjusting at least one of the plurality of positions and the plurality of orientations. The operations also include assigning the plurality of item containers to the layer of the shipping container based on the first node and the plurality of neighboring nodes.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship."

The embodiments may execute an algorithm to assign item containers, such as item boxes, to a shipping container, such as a pallet. For example, a computing device may obtain, from a database, container data characterizing one or more attributes of a shipping container. The computing device may also obtain, from the database, item data characterizing one or more attributes of one or more item containers. The computing device may execute an algorithm that operates on the container data and the item data to assign the one or more item containers to the shipping container. For instance, the computing device assign each of the item containers to a layer of the shipping container. The layer may be a bottom layer, a middle layer, or a top layer of the shipping container, for instance. Each layer may include item containers that are placed next to or on top of each other. Moreover, the item containers associated with each layer may be assigned such that a height across the layer varies less than a threshold value (e.g., 25 mm, 0.5 inches, etc.).

In some examples, the algorithm includes selecting item containers for a current layer, and determining a plurality of item container orientations and a plurality of item positions of each item container within the current layer. Further, the algorithm includes assigning the item containers to the layer based on the plurality of item container orientations and the plurality of item container positions. In some examples, the algorithm includes generating a fitness value for each configuration of the layer, and assigns the item containers to the layer in accordance with the configuration associated with the most favorable fitness value. The algorithm may include generating another layer with additional item containers, and may continue to generate layers until there are no item containers left, or until one or more stopping criteria is met. For instance, the algorithm will stop adding layers if a total weight of items exceeds a maximum weight for the shipping container, a total height exceeds a maximum height, or any other stopping criteria is met. The algorithm may also include mapping the generated layers to physical layers of the shipping container. For example, the algorithm may operate on strength data characterizing a strength of the item containers to determine a strength of each layer, and may determine to map a strongest layer to the physical bottom layer of the shipping container. Likewise, the algorithm may determine to map the least strongest layer to the top layer of the shipping container.

In some examples, the computing device may generate item assignment data characterizing the assignment of the item containers to the shipping container, and may transmit the item assignment data to another computing device for display. For instance, the computing device may transmit the item assignment data to each of a plurality of devices used by shipping personnel. The plurality of devices may be wearable devices, for instance, and may display the item container positions and orientations. For instance, the item assignment data may identify a position and orientation of each item container for each layer. The wearable device may generate a display of the positions and orientations of the item containers first for a bottom layer. Once the shipping personnel packs the item containers in accordance with the display, the shipping personnel may provide an input to the wearable device. In response, the wearable device displays the next layer to be packed, and so on until all of the layers are packed onto the shipping container.

Figure 1:
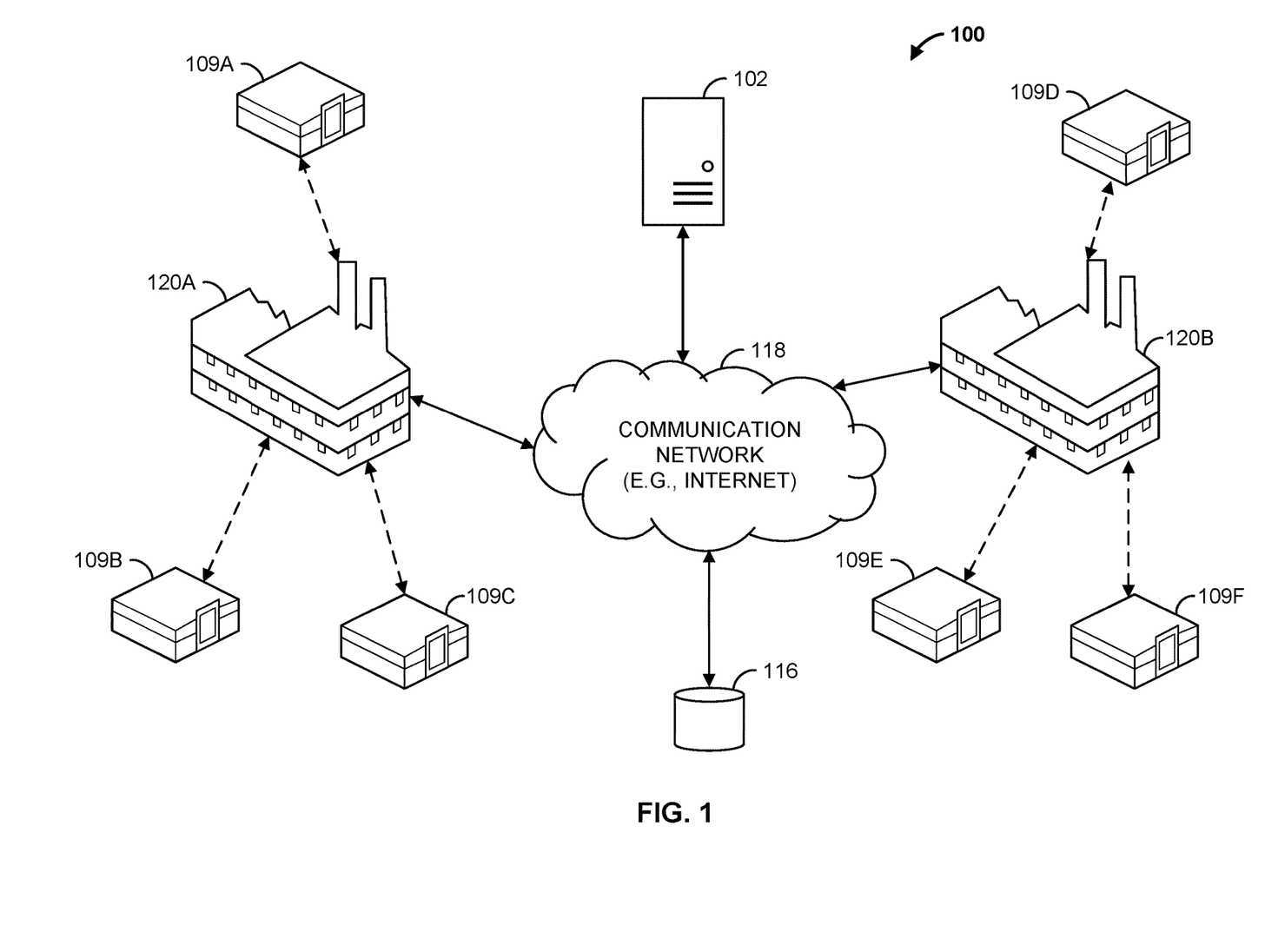
FIG. 1 is a block diagram of an item assignment system in accordance with some embodiments.

Turning to the drawings, FIG. 1 illustrates a block diagram of an item assignment system 100 that includes item assignment computing device 102 (e.g., a server, such as an application server), a plurality of distribution centers 120A, 120B, a plurality of stores 109A, 109B, 109C, 109D, 109E, 109F, and a database 116 operatively coupled over network 118. Although not shown for simplicity, each distribution center 120A, 120B and each store 109 may include one or more computing devices, such as one or more servers, tablets, smart phones, wearable devices, or any other suitable computing device that can communicate over network 118. Item assignment computing device 102 can be any suitable computing device that includes any hardware or hardware and software combination for processing data. For example, item assignment computing device 102 can include one or more processors (e.g., each processor including one or more processing cores), one or more field-programmable gate arrays (FPGAs), one or more application-specific integrated circuits (ASICs), one or more state machines, digital circuitry, or any other suitable circuitry. In addition, item assignment computing device 102 can transmit data to, and receive data from, communication network 118. Item assignment computing device 102 can be a computer, a workstation, a laptop, a tablet, a server such as a cloud-based server, a distributed computing system, or one or more of any other suitable device.

Distribution centers 120A, 120B may hold goods that one or more corresponding stores 109 may sell. For instance, distribution center 120A may receive item boxes for a variety of items sold at stores 109A, 109B, 109C. Shipping personnel at distribution center 120A may pack shipping containers, such as pallets, with item boxes for each store 109A, 109B, 109C. The shipping personnel may pack the shipping containers in accordance with item assignment data received from item assignment computing device 102, as described herein. For example, item assignment computing device 102 may transmit item assignment data to a wearable device of a shipping employee, which may cause the wearable device to display a configuration of item containers to be packed within a shipping container, in accordance with the item assignment data. Once packed, the shipping containers may be placed on delivery trucks that deliver the item containers to the corresponding store 109A, 109B, 109C. Similarly, shipping personnel at distribution center 120B may pack item containers, such as pallets, with item boxes for each store 109D, 109E, 109F. The item containers may then be placed on delivery trucks that deliver the item containers to the corresponding store 109D, 109E, 109F.

Database 116 can be a remote storage device, such as a cloud-based server, a memory device on another application server, a networked computer, or any other suitable remote storage. Item assignment computing device 102 is operable to communicate with database 116 over communication network 118. For example, item assignment computing device 102 can store data to, and read data from, database 116. For instance, item assignment computing device 102 may store item assignment data within database 116. Item assignment data may characterize an assignment of item containers to shipping containers for deliver to a store, such as store 109A. Although shown remote to item assignment computing device 102, in some examples, database 116 can be a local storage device, such as a hard drive, a non-volatile memory, or a USB stick.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

In some instances, item assignment computing device 102 determines a best configuration of item containers at each of a plurality of layers for a shipping container to be shipped from a distribution center 120A, 120B, where each layer includes one or more of the item containers in a particular configuration. For instance, item assignment computing device 102 may determine a size (e.g., a height, width, and length) of each item container and, based on the sizes, may determine a position and an orientation of each item box within a layer for the shipping container.

Figure 4:
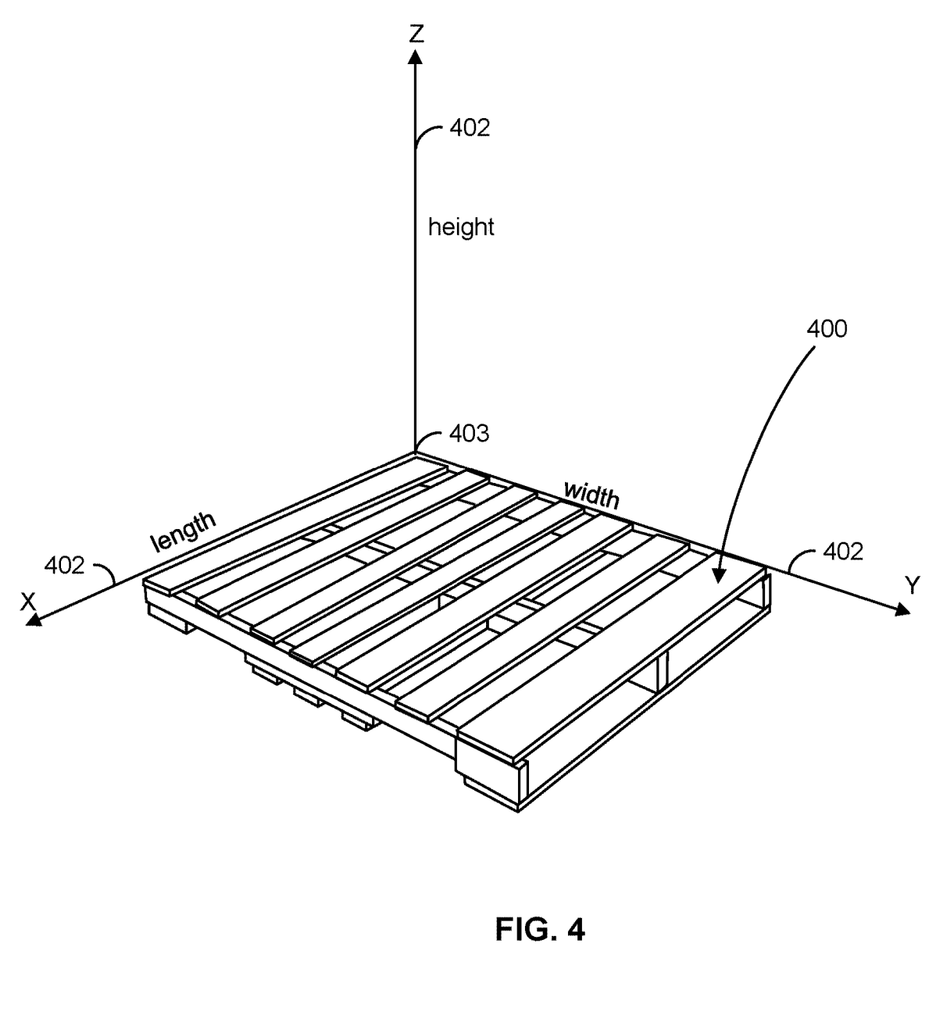
FIG. 4 illustrates an item container in accordance with some embodiments.
Figure 5A:
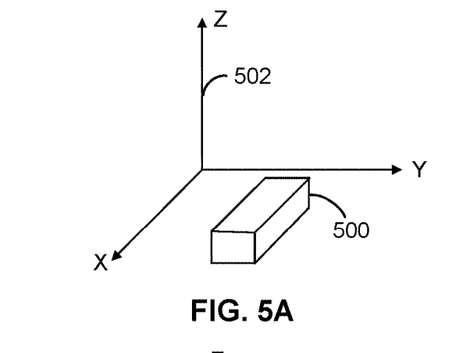
FIGS. 5A, 5B, 5C, 5D, 5E, and 5F illustrate various orientations of item containers in accordance with some embodiments.
Figure 5B:
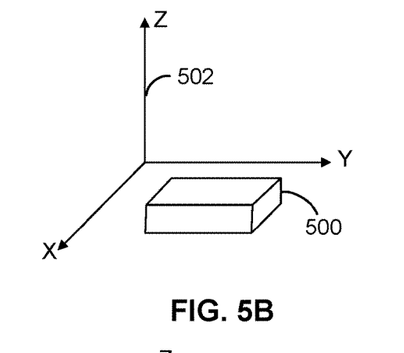
Figure 5C:
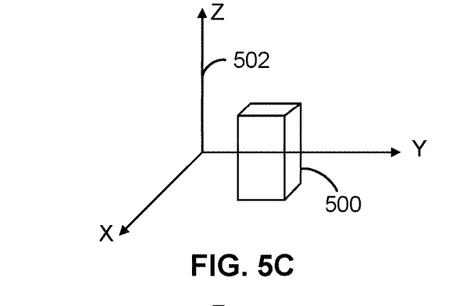
Figure 5D:
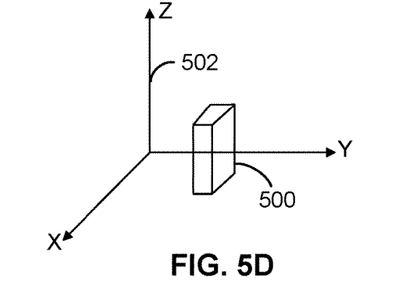
Figure 5E:
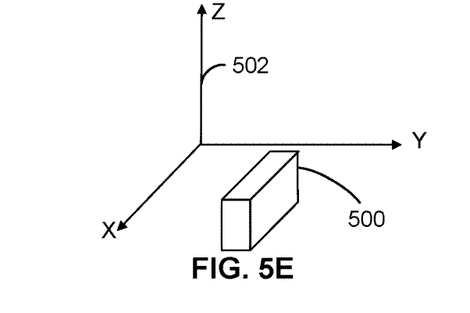
Figure 5F:
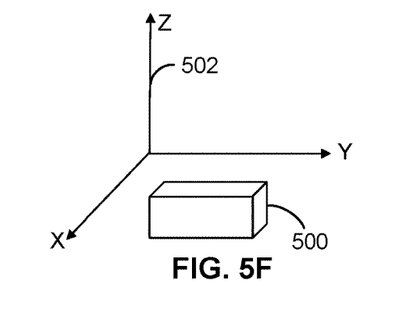

For example, FIG. 4 illustrates a pallet 400 within a coordinate system 402 that identifies a length, a width, and a height. Item containers, such as item boxes, may be stacked on pallet 400. FIGS. 5A-5F illustrate an item container 500 within a coordinate system 502, where the item container is displayed in each of six orientations. For instance, each configuration has a different face of the item container 500 along the X-Y plane. Item assignment computing device 102 may determine an orientation for each item container from the various orientations displayed in FIGS. 5A-5F, for instance. Further, the position determined for each item container 500 may be with respect to the origin 403 of the coordinate system 402.

Referring back to FIG. 1, once the layers are generated, item assignment computing device 102 may adjust the starting height of item containers corresponding to the layer. For example, and with reference to FIG. 4, a position of (x, y, z) may identify a starting position for an item container in a given orientation within coordinate system 402. The layers can be distinguished based on the "z" starting position. For example, a first layer may include at least some item containers with a "z" starting position (e.g., height) of 0 (and thus indicating a first layer to be stacked on the pallet), whereas a second layer may include item containers with a "z" starting position greater than 0 (e.g., indicating a layer that is to be stacked upon the first, or another, layer). In some examples, item assignment computing device 102 may determine an order the layers are to be stacked on the shipping container. For instance, item assignment computing device 102 may determine a weight of each layer based on the weight of each item assigned to a layer, and may order the layers based on their corresponding weight (e.g., heaviest layer first (e.g., on bottom to be stacked first), and the lightest layer last (e.g., on top to be stacked last)).

Referring back to FIG. 1, in some examples, item assignment computing device 102 may obtain one or more additional attributes of each item box, such as a strength, a density, and one or more categories of the items within each box. The additional attributes may be obtained, in some examples, from a received item assignment request as described below, or in other examples from database 116. Item assignment computing device 102 may then determine the position and orientation of the item box within a layer based on the sizes and the one or more additional attributes. Item assignment computing device 102 may further generate assignment data characterizing the positions and orientations of the item boxes within the shipping container, and may transmit the assignment data for display. For example, item assignment computing device 102 may transmit the assignment data to one or more wearable devices of shipping personnel at distribution center 120A for loading shipping containers that are to be shipped to one or more stores 109A, 109B, 109C.

In some examples, item assignment computing device 102 receives an item assignment request from a distribution center 120A, 120B, where the item assignment request identifies a plurality of item containers. For example, the item assignment request may include an item identifier (ID) to identify each item container. The item ID may be, for instance, a Universal Product Number (UPC), an European Article Number (EAN) Code, or an International Standard Book Number (ISBN). Based on the item IDs, item assignment computing device 102 may obtain, from database 116, one or more attributes of each item container. For instance, item assignment computing device 102 may obtain one or more of a length, width, height, weight, density, strength, category, or sub-category value for each item container from database 116. The item assignment request may also identify a shipping container using, for instance, a shipping container ID. In some examples, and based on the shipping container ID, item assignment computing device 102 may obtain from database 116 attributes of the shipping container, such as one or more of a length, width, height, and maximum weight. In some examples, the item assignment request includes the attributes of the shipping container. Item assignment computing device 102 may then determine a subset of the plurality of item containers for assigning to one or more layers of the shipping container. For instance, item assignment computing device 102 may select the subset of the plurality of item containers randomly, or based on one or more of the item attributes, such as weight.

In some examples, item assignment computing device 102 determines a volume of each item container, and selects the subset of the plurality of item containers based on the determined volume. For instance, item assignment computing device 102 may begin select item containers from a highest volume until a smallest volume. For each selected item container, item assignment computing device 102 may determine a plurality of positions and a plurality of orientations based on the corresponding item container attributes. Item assignment computing device 102 may then assign the item container to the layer, and may continue to assign item containers to the layer until one or more predetermined conditions are satisfied. The predetermined conditions may include, for example, one or more of a total length (e.g., the length of the shipping container), a total width (e.g., the width of the shipping container), a total volume, a maximum height (e.g., add item containers until adding another one will cause a height to be above a predetermined amount), or any other suitable predetermined condition. As an example, item assignment computing device 102 may determine the plurality of positions and the plurality of orientation for a subset of item containers for a layer such that a total height of item containers must be within a particular height range (e.g., an inch, three centimeters, etc.). Thus, across the layer, a height varies at most by the height range. Further, item assignment computing device 102 may assign the item containers to the layer such that a total length and width of the layer (comprised of the item containers) does not exceed a corresponding length and width of the shipping container.

In some examples, to generate a layer (i.e., assign item containers to a layer of a shipping container), item assignment computing device 102 may determine an initial position and an initial orientation for a container. Item assignment computing device 102 may do likewise for additional item containers until, for instance, one or more of the predetermined conditions are satisfied. Item assignment computing device 102 may assign (e.g., label) the configuration as a first node, and may determine one or more neighboring nodes by adjusting at least one position and/or orientation for one of the assigned item containers. For example, one neighboring node may correspond to the same configuration as the first node, but with one container in a different orientation. Similarly, item assignment computing device 102 may determine several neighboring nodes, in some examples a neighboring node for each position or orientation adjustment to each item container. Item assignment computing device 102 may then determine the most preferable configuration from among the first node and the neighboring nodes based on one or more predetermined criteria.

For example, item assignment computing device 102 may generate a fitness value for each configuration of the layer, and assigns the item containers to the layer in accordance with the configuration associated with the most favorable fitness value. The fitness value may be computed based on, for example, the amount of "gap space" (i.e., air space where no item container is taking up volume) for each configuration, an average height of each configuration, a height range of each configuration, or any other suitable layer attribute. For example, item assignment computing device 102 may determine the volume of "gap space" for each configuration, and selects the node corresponding to the configuration with the least gap space. In some examples, item assignment computing device 102 filters out nodes that violate one or more predetermined conditions, and for the remaining nodes, determines the volume of gap space. Item assignment computing device 102 selects the node corresponding to the configuration with the most gap space. The item containers are then assigned to the layer based on the selected configuration.

Item assignment computing device 102 may generate layers until a stopping criteria is met. For instance, item assignment computing device 102 may generate layers until adding an additional layer will cause a maximum weight for the shipping container to be exceeded, or for a total height to exceed a maximum height.

In some examples, once each layer is generated (e.g., the item containers are assigned to a layer of the shipping container), item assignment computing device 102 generates an item assignment response identifying the assignments for the generated layer. Item assignment computing device 102 may transmit the item assignment response, such as to wearable devices of shipping personnel at distribution center 120A, 120B. The item assignment response may include the position and orientation of each item container with respect to a position on the shipping container. Further, the item assignment response may cause the wearable devices to display one or more layers of the item container assignments to the shipping personnel. Thus, as each layer is generated, items assigned to a layer are placed the shipping container.

In some examples, all layers are generated for a shipping container, and item assignment computing device 102 then determines an order of the layers to be stacked on the shipping container. For instance, item assignment computing device 102 may determine the weight of each layer, and assign the heaviest layer to be placed on the shipping container first. Similarly, item assignment computing device 102 may assign the order of the remaining layers based on total weight. In some examples, item assignment computing device 102 may determine the orders based on item container strength. For example, a layer with a higher overall item container strength (e.g., by adding all of the item container strengths, or determining an average of all of the item container strengths), may be assigned to be placed first on the shipping container. Similarly, the remaining layers may be ordered based on overall item container strength. In some instances, item assignment computing device 102 determines the weight and strength of each layer, applies a corresponding weight to each, and adds the totals to determine a layer value. Item assignment computing device 102 may then determine the order of the layers based on the layer values.

Once the layers are assigned to an order for the shipping container, item assignment computing device 102 may generate an item assignment response identifying the assignments and, in some instances, layer orders. Item assignment computing device 102 may transmit the item assignment response, such as to wearable devices of shipping personnel at distribution center 120A, 120B. The item assignment response may include the position and orientation of each item container with respect to a position on the shipping container. Further, the item assignment response may cause the wearable devices to display one or more layers of the item container assignments to the shipping personnel. For instance, a first layer to be stacked on the shipping container may be presented first. Once the first layer has been stacked, the shipping personnel may provide an input to the wearable device, causing the wearable device to display the next layer to be stacked. Likewise, and upon additional inputs from the shipping personnel, the additional layers are displayed until the shipping container has been fully stacked.

In some examples, item assignment computing device 102 executes a tabu search to determine the item container assignments. For instance, item assignment computing device 102 may generate a first node that identifies a configuration of a layer for a shipping container based on an initial position of a plurality of positions and an initial orientation of a plurality of orientations of a plurality of item containers. Item assignment computing device 102 also generates a plurality of neighboring nodes identifying corresponding configurations of the layer based on adjusting at least one of the plurality of positions and the plurality of orientations. Further, item assignment computing device 102 assigns the plurality of item containers to the layer of the shipping container based on the first node and the plurality of neighboring nodes.

In some examples, item assignment computing device 102 generates a fitness value for each configuration of the layer identified by the first node and the plurality of neighboring nodes. Item assignment computing device 102 then selects a configuration of the layer identified by the first node and the plurality of neighboring nodes based on the fitness values. Further, item assignment computing device 102 assigns the plurality of item containers to the layer of the shipping container in accordance with the selected configuration. In some instances, item assignment computing device 102 generates the fitness values based on an amount of gap space in each configuration. In some instances, item assignment computing device 102 determines a height range of each of the plurality of neighboring nodes, and generates the fitness values based on the height range. In some examples, item assignment computing device 102 determines that the height range corresponding to at least one of the plurality of neighboring nodes exceeds a predetermined threshold. In response, item assignment computing device 102 assigns the plurality of item containers to the layer of the shipping container in accordance with another of the plurality of neighboring nodes.

In some examples, item assignment computing device 102 generates item assignment data identifying the assignments of the plurality of item containers, and stores the item assignment data in a data repository, such as database 116. In some examples, item assignment computing device 102 receives an item assignment request identifying the plurality of item containers. Further, and in response to the item assignment request, item assignment computing device 102 transmits an item assignment response that includes the item assignment data.

In some examples, the item assignment request includes at least one attribute of each of the plurality of item containers. Item assignment computing device 102 extracts the at least one attribute of each of the plurality of item containers from the item assignment request, and generates the item assignment data for the plurality of item containers based on the corresponding at least one attribute for each of the plurality of item containers.

In some examples, a system, such as a system that includes item assignment computing device 102, executes a process for optimizing a pallet algorithm for improving packing efficiency and/or pallet stability. The system creates a layer in the pallet building algorithm using a search, such as a tabu search, for example. The pallet building algorithm includes creating a feasible layer, recording it as a current solution, and setting a best solution based on the current solution. Further, a candidate solution for the layer creation consists of a list of containers (e.g., cases, boxes), each with its own orientation and stacking sequence number. The system creates a number of neighboring solutions using a predefined neighborhood structure. The neighboring solutions are created by changing the orientation of a specific case and/or the stacking sequence of a case. The system evaluates fitness of the neighborhood solutions and sorts them according to their fitness. The fitness is evaluated by placing the cases onto the pallets by using an iterative stacking procedure. The best neighboring solution that is not tabooed and/or meets the aspiration criteria is selected as a new solution. The best solution is further updated based on the new solution.

Figure 2:
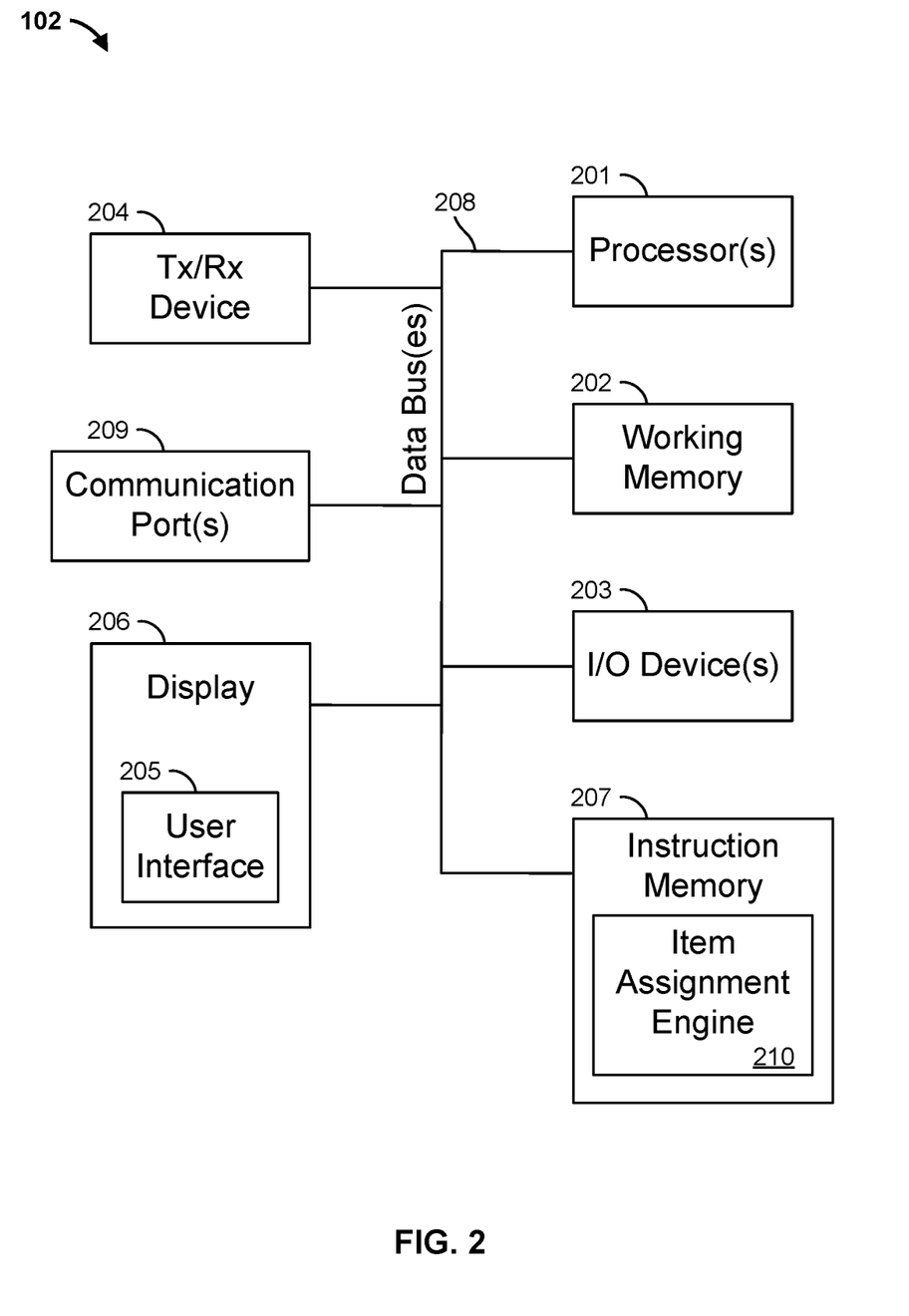
FIG. 2 is a block diagram of an exemplary item assignment computing device in accordance with some embodiments.

FIG. 2 illustrates an exemplary item assignment computing device 102 of FIG. 1. Item assignment computing device 102 can include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can store instructions that, when executed by one or more processors 201, cause the one or more processors 201 to perform any of the operations described herein, including generating assignment data as described herein. Instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. In this example, instruction memory 207 includes item assignment engine 210, which includes instructions that, when executed by one or more processors, such as processors 201, generate item assignment data as described herein.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of Item assignment computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as item attribute data.

Display 206 can display user interface 205. User interfaces 205 can enable user interaction with item assignment computing device 102. For example, user interface 205 can be a user interface for an application that allows for the enabling, and disabling, of predetermined conditions. In some examples, a user can interact with user interface 205 by engaging input-output devices 203. For example, the user may provide input to item assignment computing device 102 via user interface 205. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 Item assignment computing device 102 will be operating in. Processor(s) 201 is operable to receive data from, or send data to, a network, such as communication network 118 of FIG. 1, via transceiver 204.

Figure 3:
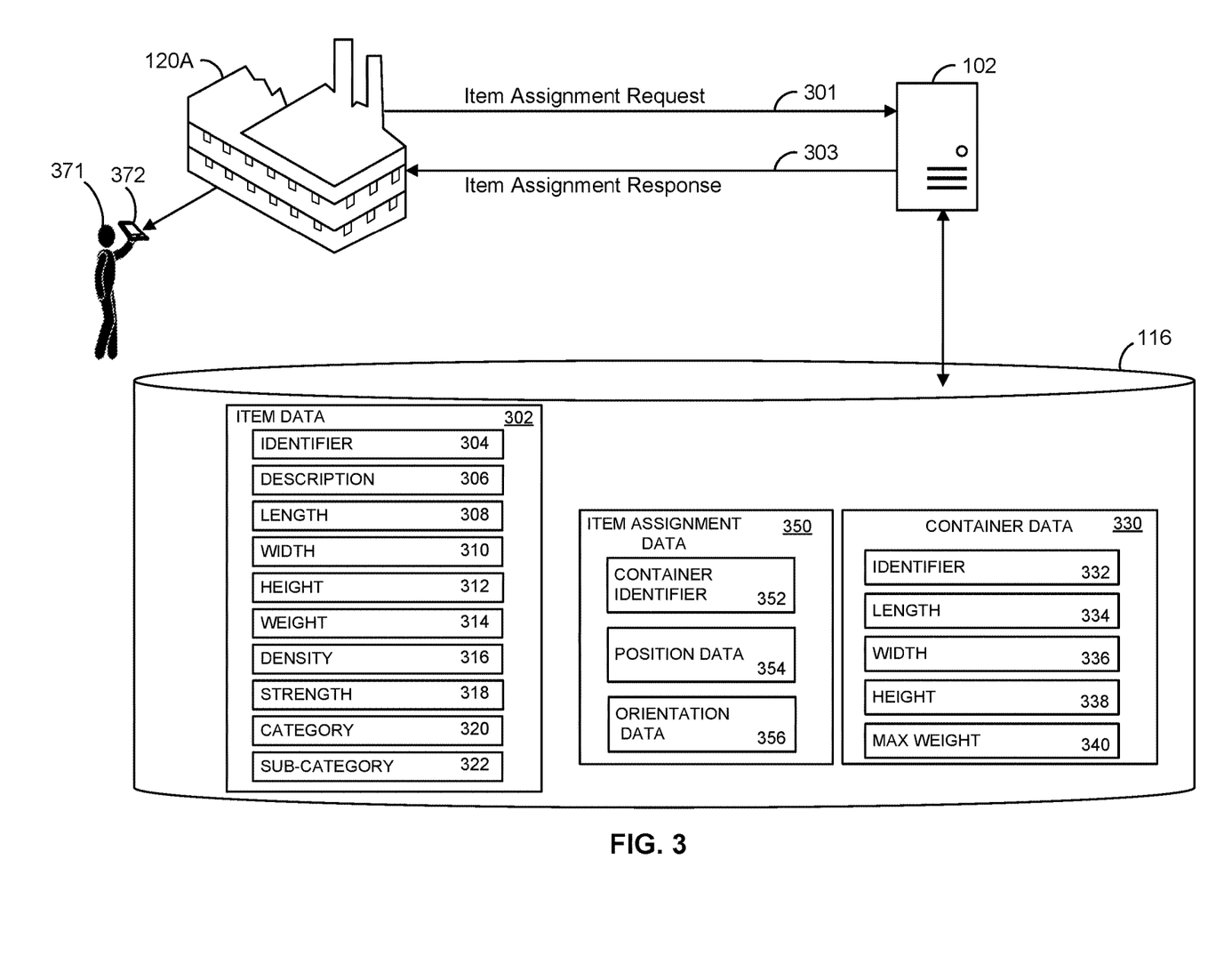
FIG. 3 is a block diagram illustrating examples of various portions of the item assignment system of FIG. 1 in accordance with some embodiments.

FIG. 3 is a block diagram illustrating examples of various portions of the item assignment system of FIG. 1. In this example, item assignment computing device 102 receives an item assignment request 301 from distribution center 120A. The item assignment request 301 may identify item containers, such as item container 500. For instance, the item assignment request 301 may include an item ID of the item container 500. The item assignment request 301 may, in some examples, further identify a shipping container, such as pallet 400.

Based on the item ID, item assignment computing device 102 may obtain one or more attributes of the item from database 116. For instance, database 116 stores item data 302, which identifies a plurality of attributes of each of a plurality of items. For each item, item data 302 may include an item ID 304, a description 306, a length 308, and width 310, a height 312, a weight 314, a density 316, a strength 318, a category 320, and a sub-category 322. The description 306 may identify additional attributes (e.g., properties) of the items within the item container. The strength 318 may identify a weight (e.g., in pounds, kilograms, etc.) that an item container can sustain. The density 316 may reflect whether the item container includes gap space. For instance, a higher density value may reflect less gap space than a lower density value. The category 320 may identify, for instance, a retail department (e.g., frozen, toys, clothing, etc.), while the sub-category 322 may identify additional information about the item container (e.g., cans, pouches, paper towels, etc.). In some examples, the item assignment request 301 includes the one or more attributes of the item, such as all or portions of item data 302 for the item.

Item assignment computing device 102 may select a subset of the item containers identified within the item assignment request 301 to assign to a layer of the shipping container. For example, for each item container, item assignment computing device 102 may determine a plurality of positions and a plurality of orientations based on the corresponding item data 302. Item assignment computing device 102 may then assign item containers to the layer based on the plurality of positions and the plurality of orientations, and may continue to assign item containers to the layer until one or more predetermined conditions are satisfied, as described herein.

In some examples, item assignment computing device 102 assigns a first configuration of item containers as a first node, and determines one or more neighboring nodes by adjusting at least one position and/or orientation for one of the assigned item containers. Item assignment computing device 102 may then determine the most preferable configuration from among the first node and the neighboring nodes based on one or more predetermined criteria. Item assignment computing device 102 assigns the item containers to the layer based on the selected configuration.

In some examples, item assignment computing device 102 may generate layers until a stopping criteria is met. For instance, item assignment computing device 102 may generate layers until adding an additional layer will cause a maximum weight for the shipping container to be exceeded, or for a total height to exceed a maximum height In some examples, once each layer is generated (e.g., the item containers are assigned to a layer of the shipping container), item assignment computing device 102 generates item assignment data 350 characterizing the positions and orientations of the item containers (e.g., with respect to a position on the shipping container, such as origin 403), and may store the item assignment data 350 within database 116. For example, the item assignment data 350 may include a shipping container ID 352, position data 354 identifying the starting positions of the item containers, and orientation data 356 identifying the orientations of the item containers (e.g., one of the six orientations of FIGS. 5A-5F). For example, the item assignment data 350 may include a shipping container ID 352, position data 354 identifying the starting positions of the item containers, and orientation data 356 identifying the orientations of the item containers (e.g., one of the six orientations of FIGS. 5A-5F).

In some examples, once the item containers are assigned to a layer of the shipping container, item assignment computing device 102 determines an order for stacking the layers on the shipping container. For example, and as described herein, the order of the layers may be based on total weight, total gap space, total density, or any other determined (e.g., computed) property of the layers. Item assignment computing device 102 may then generate item assignment data 350 characterizing the positions and orientations of the item containers (e.g., with respect to a position on the shipping container, such as origin 403), and may store the item assignment data 350 within database 116.

Item assignment computing device 102 may then package portions, or all of, the item assignment data 350 within an item assignment response 303, and may transmit the item assignment response 303 to a wearable device 372 of a shipping employee 371 at datacenter 120A.

Figure 6:
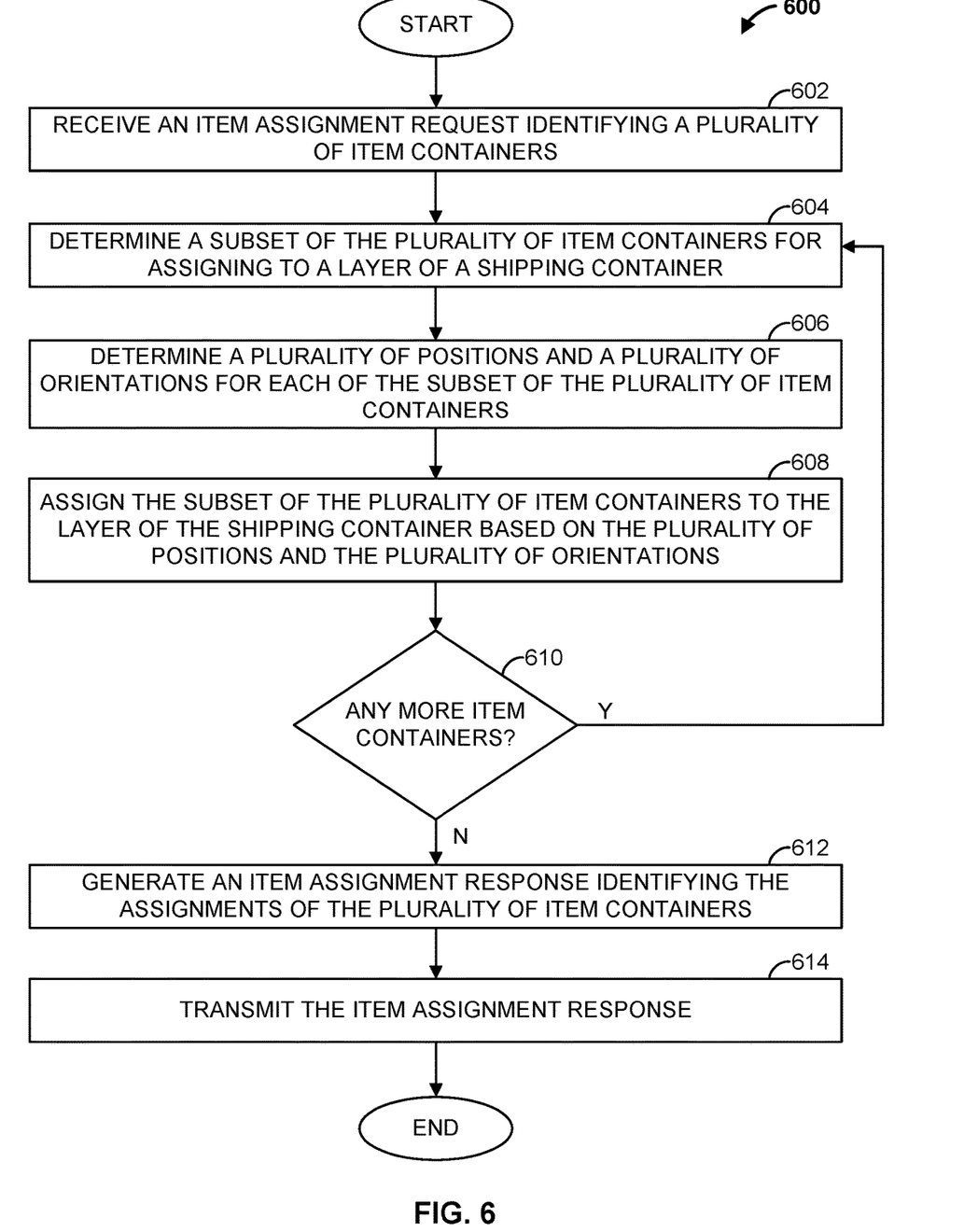
FIG. 6 is a flowchart of an example method that can be carried out by the item assignment system of FIG. 1 in accordance with some embodiments.

FIG. 6 is a flowchart of an example method 600 that can be carried out by, for example, the item assignment computing device 102 of FIG. 1. Beginning at step 602, an item assignment request is received. The item assignment request identifies a plurality of item containers. For instance, the item assignment request may include an item ID 304 for each item container. At step 604, a subset of the plurality of item containers are determined for assigning to a layer of a shipping container. For instance, item assignment computing device 102 may determine the subset of the plurality of item containers randomly. In some examples, item assignment computing device 102 may determine the subset of the plurality of item containers based on one or more attributes of item data 302.

Proceeding to step 606, a plurality of positions and a plurality of orientations are determined for each of the subset of the plurality of item containers, and at step 608, the subset of the plurality of item containers are assigned to the layer of the shipping container based on the plurality of positions and the plurality of orientations. In some instances, item assignment computing device 102 executes a tabu search to determine the item container assignments.

For example, item assignment computing device 102 may determine an initial position for each of the subset of the plurality of item containers, and an initial orientation (e.g., one of the six orientations of FIGS. 5A-5F). Item assignment computing device 102 may assign the configuration as a first node, and may determine one or more neighboring nodes by adjusting at least one position and/or orientation for one of the assigned item containers. For example, one neighboring node may correspond to the same configuration as the first node, but with one container in a different orientation. Similarly, item assignment computing device 102 may determine several neighboring nodes, in some examples a neighboring node for each position or orientation adjustment to each item container. Item assignment computing device 102 may then determine the most preferable configuration from among the first node and the neighboring nodes based on one or more predetermined criteria, such as the one or more predetermined criteria described herein, and may assign the subset of the plurality of item containers to the layer in accordance with the most preferable configuration.

At step 610, a determination is made as to whether there any more item containers to assign to the shipping container. If there are, the method returns to step 604 to determine a new subset of the plurality of item containers. Otherwise, if no more item containers are to be assigned, the method proceeds to step 612.

At step 612, an item assignment response is generated identifying the assignments of the plurality of item containers. For example, item assignment computing device 102 may generate item assignment data 350 characterizing the positions and orientations of the plurality of item containers, and may package the item assignment data 350 within an item assignment response 303. At step 614, the item assignment response is transmitted. For example, the item assignment response may be transmitted to one or more wearable devices of shipping personnel at distribution center 120A, causing the wearable devices to display the positions of orientations of each item container for stacking the shipping container. The method then ends.

Figure 7:
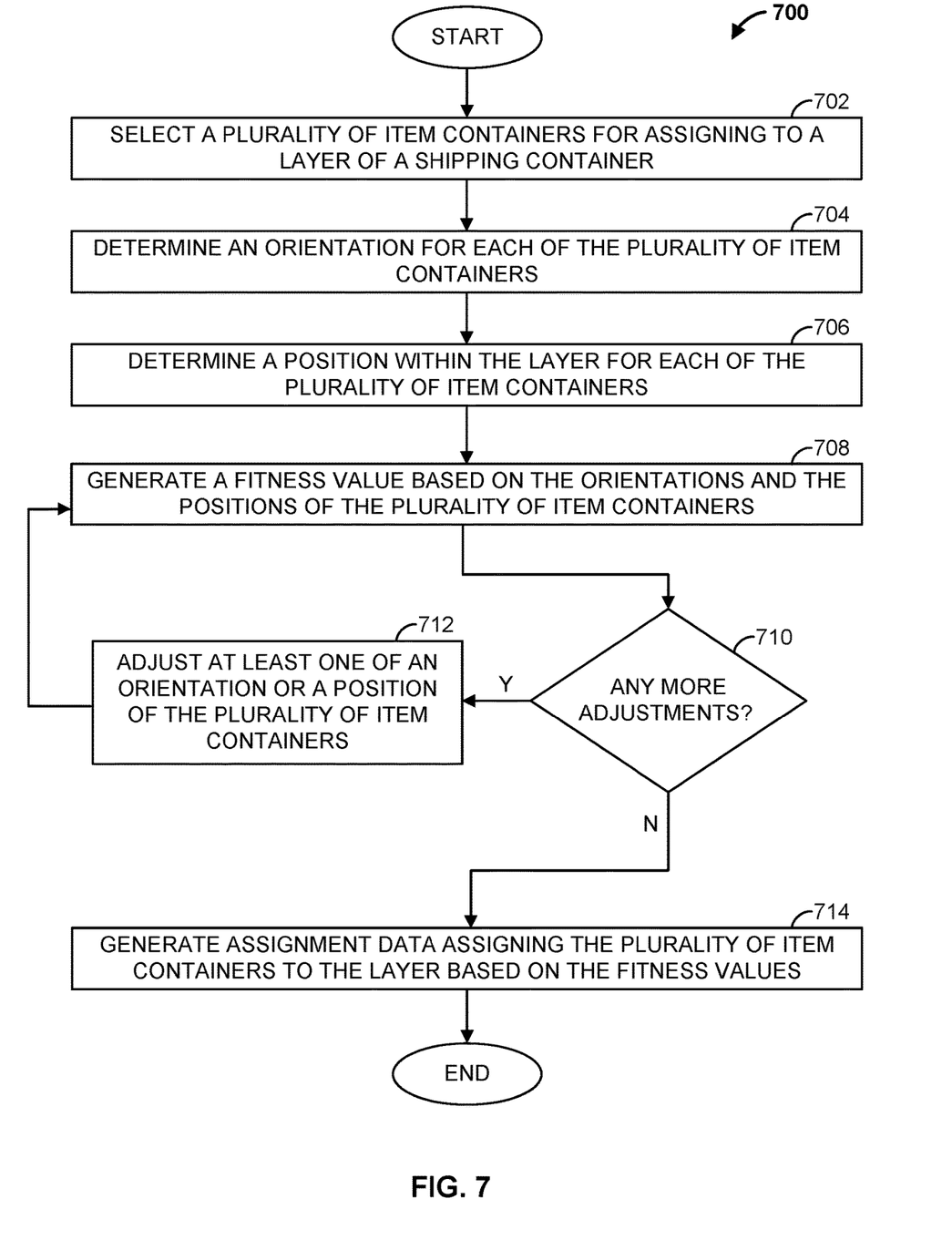
FIG. 7 is a flowchart of another example method that can be carried out by the item assignment system of FIG. 1 in accordance with some embodiments.

FIG. 7 is a flowchart of an example method 700 that can be carried out by the item assignment computing device 102 of FIG. 1. Beginning at 702, a plurality of item containers are selected for assigning to a layer of a shipping container. For example, item assignment computing device 102 may select the plurality of item containers based on item data 302 stored in database 116.

At step 704, an orientation for each of the plurality of containers is determined. For example, item assignment computing device 102 may determine an initial orientation from the orientations displayed in FIGS. 5A-5F for each of the plurality of containers. At step 706, a position within the layer is determined for each of the plurality of item containers. For example, item assignment computing device 102 may determine an initial position within coordinate system 402. Further, and at step 708, a fitness value is generated based on the orientations and the positions of the plurality of item containers. For example, item assignment computing device 102 may generate a fitness value based on the position and orientation determined for each of the plurality of item containers.

At step 710, a determination is made as to whether any more adjustments to the positions and/or orientations of the plurality of item containers are to be made. For example, item assignment computing device 102 may determine if the plurality of item containers have been evaluated at each of the orientations of FIGS. 5A-5F. If an additional adjustment is to be made, the method proceeds to step 712, where at least one of an orientations or a position of the plurality of item containers is adjusted. The method then proceeds to step 708 to generate another fitness value.

If, however, at step 710 there are no additional adjustments to be made, the method proceeds to step 714. At step 714, assignment data is generated. The assignment data assigns the plurality of item containers to the layer based on the fitness values. For example, item assignment computing device 102 may assign the plurality of item containers to the layer in accordance with the configuration associated with the most favorable fitness value. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:
1. A system comprising:
at least one processor; and
a non-transitory machine readable medium storing instructions that, when executed, cause the at least one processor to:
receive, from a remote device over a network, an item assignment request identifying a plurality of item containers to be assigned to a shipping container;
in response to receiving the item assignment request:
receive, from a database, item container data characterizing a plurality of attributes of the plurality of item containers;
generate a first node identifying a configuration of a first layer of a plurality of layers for the shipping container based on an initial position of a plurality of positions and an initial orientation of a plurality of orientations of the plurality of item containers;
generate a plurality of neighboring nodes identifying corresponding configurations of the first layer based on adjusting at least one of the plurality of positions and the plurality of orientations;

generate, for each configuration of the first layer identified by the first node and the plurality of neighboring nodes, a fitness value based on an amount of gap space and a height range of the configuration;

select a configuration of the first layer identified by the first node and the plurality of neighboring nodes based on the fitness values;

determine a first weight of the first layer based on at least a first of the plurality of attributes of the plurality of item containers;

determine a first strength of the first layer based on at least a second of the plurality of attributes of the plurality of item containers;

determine an order of the first layer and a second layer of the plurality of layers based on the first weight, the first strength, a second weight of the second layer, and a second strength of the second layer;

generate assignment data characterizing an assignment of the plurality of item containers to the first layer of the shipping container based on the selected configuration, wherein the assignment data comprises; a position of the plurality of positions and an orientation of the plurality of orientations for each of the plurality of item containers, and the order of the first layer and the second layer of the plurality of layers; and transmit, over the network, the assignment data for displaying, at the remote device, the position and the orientation for each of the plurality of item containers for stacking the layer of the shipping container.

2. The system of claim 1, wherein the computing device is configured to generate the fitness values based on an amount of gap space in each configuration.

3. The system of claim 1, wherein the computing device is configured to:

determine a height range of each of the plurality of neighboring nodes; and generate the fitness values based on the height range.

4. The system of claim 3, wherein the computing device is configured to:

determine that the height range corresponding to at least one of the plurality of neighboring nodes exceeds a predetermined threshold; and assign the plurality of item containers to the layer of the shipping container in accordance with another of the plurality of neighboring nodes.

5. The system of claim 1, wherein the computing device is configured to:

generate item assignment data identifying the assignments of the plurality of item containers; and store the item assignment data in a data repository.

6. The system of claim 5, wherein the computing device is configured to:

receive an item assignment request identifying the plurality of item containers;

in response to the item assignment request, transmit an item assignment response that includes the item assignment data.

7. A method by at least one processor comprising:

receiving, from a remote device over a network, an item assignment request identifying a plurality of item containers to be assigned to a shipping container;

in response to receiving the item assignment request:

receiving, from a database, item container data characterizing a plurality of attributes of the plurality of item containers;

generating a first node identifying a configuration of a first layer of a plurality of layers for the shipping container based on an initial position of a plurality of positions and an initial orientation of a plurality of orientations of the plurality of item containers;

generating a plurality of neighboring nodes identifying corresponding configurations of the first layer based on adjusting at least one of the plurality of positions and the plurality of orientations;

generating, for each configuration of the first layer identified by the first node and the plurality of neighboring nodes, a fitness value based on an amount of gap space and a height range of the configuration;

selecting a configuration of the first layer identified by the first node and the plurality of neighboring nodes based on the fitness values;

determining a first weight of the first layer based on at least a first of the plurality of attributes of the plurality of item containers;

determining a first strength of the first layer based on at least a second of the plurality of attributes of the plurality of item containers;

determining an order of the first layer and a second layer of the plurality of layers based on the first weight, the first strength, a second weight of the second layer, and a second strength of the second layer;

generating assignment data characterizing an assignment of the plurality of item containers to the first layer of the shipping container based on the selected configuration, wherein the assignment data comprises: a position of the plurality of positions and an orientation of the plurality of orientations for each of the plurality of item containers, and the order of the first layer and the second layer of the plurality of layers; and transmitting, over the network, the assignment data for displaying, at the remote device, the position and the orientation for each of the plurality of item containers for stacking the layer of the shipping container.

8. The method of claim 7, comprising generating the fitness values based on an amount of gap space in each configuration.

9. The method of claim 7, comprising:

determining a height range of each of the plurality of neighboring nodes; and generating the fitness values based on the height range.

10. The method of claim 9, comprising:

determining that the height range corresponding to at least one of the plurality of neighboring nodes exceeds a predetermined threshold; and assigning the plurality of item containers to the layer of the shipping container in accordance with another of the plurality of neighboring nodes.

11. The method of claim 7, comprising:

generating item assignment data identifying the assignments of the plurality of item containers; and storing the item assignment data in a data repository.

12. The method of claim 11, comprising:

receiving an item assignment request identifying the plurality of item containers;

in response to the item assignment request, transmitting an item assignment response that includes the item assignment data.

13. A non-transitory computer readable medium having instructions stored thereon, wherein the instructions, when executed by at least one processor, cause a device to perform operations comprising:

receiving, from a remote device over a network, an item assignment request identifying a plurality of item containers to be assigned to a shipping container;

in response to receiving the item assignment request:

receiving, from a database, item container data characterizing a plurality of attributes of the plurality of item containers;

generating a first node identifying a configuration of a first layer of a plurality of layers for the shipping container based on an initial position of a plurality of positions and an initial orientation of a plurality of orientations of the plurality of item containers;

generating a plurality of neighboring nodes identifying corresponding configurations of the first layer based on adjusting at least one of the plurality of positions and the plurality of orientations;

generating, for each configuration of the first layer identified by the first node and the plurality of neighboring nodes, a fitness value based on an amount of gap space and a height range of the configuration;

selecting a configuration of the first layer identified by the first node and the plurality of neighboring nodes based on the fitness values;

determining a first weight of the first layer based on at least a first of the plurality of attributes of the plurality of item containers;

determining a first strength of the first layer based on at least a second of the plurality of attributes of the plurality of item containers;

determining an order of the first layer and a second layer of the plurality of layers based on the first weight, the first strength, a second weight of the second layer, and a second strength of the second layer;

generating assignment data characterizing an assignment of the plurality of item containers to the first layer of the shipping container based on the selected configuration, wherein the assignment data comprises; a position of the plurality of positions and an orientation of the plurality of orientations for each of the plurality of item containers, and the order of the first layer and the second layer of the plurality of layers; and transmitting, over the network, the assignment data for displaying, at the remote device, the position and the orientation for each of the plurality of item containers for stacking the layer of the shipping container.

14. The non-transitory computer readable medium of claim 13, wherein the instructions, when executed by the at least one processor, cause the device to perform operations comprising generating the fitness values based on an amount of gap space in each configuration.

15. The non-transitory computer readable medium of claim 13, wherein the instructions, when executed by the at least one processor, cause the device to perform operations comprising:

determining a height range of each of the plurality of neighboring nodes; and generating the fitness values based on the height range.

16. The non-transitory computer readable medium of claim 15, wherein the instructions, when executed by the at least one processor, cause the device to perform operations comprising:

determining that the height range corresponding to at least one of the plurality of neighboring nodes exceeds a predetermined threshold; and assigning the plurality of item containers to the layer of the shipping container in accordance with another of the plurality of neighboring nodes.

17. The non-transitory computer readable medium of claim 13, wherein the instructions, when executed by the at least one processor, cause the device to perform operations comprising:

generating item assignment data identifying the assignments of the plurality of item containers; and storing the item assignment data in a data repository.

* * * * *